(12) United States Patent
Younger et al.

(10) Patent No.: US 7,853,829 B2
(45) Date of Patent: Dec. 14, 2010

(54) NETWORK ADVISOR

(75) Inventors: Lauren Younger, Seattle, WA (US); Caleb Jones, Seattle, WA (US); Greg Vandenberg, Seattle, WA (US); John-Anthony Owens, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 532 days.

(21) Appl. No.: 11/867,671

(22) Filed: Oct. 4, 2007

(65) Prior Publication Data

US 2009/0019314 A1    Jan. 15, 2009

Related U.S. Application Data

(60) Provisional application No. 60/949,610, filed on Jul. 13, 2007.

(51) Int. Cl.
*G06F 11/00* (2006.01)
(52) U.S. Cl. ............................................ 714/37; 714/47
(58) Field of Classification Search .................. 714/37, 714/4, 45, 46, 47; 709/203, 217, 223, 224
See application file for complete search history.

(56) References Cited

U.S. PATENT DOCUMENTS

| | | | |
|---|---|---|---|
| 5,383,178 A | 1/1995 | Unverrich | |
| 5,396,485 A | 3/1995 | Ohno et al. | |
| 5,768,483 A | 6/1998 | Maniwa et al. | |
| 5,774,667 A | 6/1998 | Garvey et al. | |
| 5,974,237 A | 10/1999 | Shurmer et al. | |
| 5,978,568 A | 11/1999 | Abraham et al. | |
| 6,006,272 A | 12/1999 | Aravamudan et al. | |
| 6,023,723 A | 2/2000 | McCormick et al. | |
| 6,456,306 B1 | 9/2002 | Chin et al. | |
| 6,530,018 B2 | 3/2003 | Fleming | |
| 6,584,074 B1 | 6/2003 | Vasamsetti et al. | |
| 6,631,118 B1 | 10/2003 | Jones | |
| 6,678,250 B1 | 1/2004 | Grabelsky et al. | |
| 6,778,505 B1 | 8/2004 | Bullman et al. | |
| 6,801,941 B1 | 10/2004 | Stephens et al. | |
| 6,892,245 B1 | 5/2005 | Crump et al. | |
| 6,954,785 B1 | 10/2005 | Martin et al. | |
| 6,965,614 B1 | 11/2005 | Osterhout et al. | |

(Continued)

FOREIGN PATENT DOCUMENTS

JP     2001-222497 A     8/2001

(Continued)

OTHER PUBLICATIONS

PCT Notification of the International Search Report and the Written Opinion of the International Searching Authority, or the Declaration, International Application No. PCT/US2008/063318, mailed Sep. 25, 2008, 6 pgs.

(Continued)

*Primary Examiner*—Dieu-Minh Le
(74) *Attorney, Agent, or Firm*—Patent Capital Group

(57) ABSTRACT

A system for diagnosing the configuration and use of devices in an interconnected network. The system may be used to analyze a network and/or discrete network devices, and then suggest steps that a user may take to improve the performance or usability of the network and/or device.

20 Claims, 6 Drawing Sheets

U.S. PATENT DOCUMENTS

| | | |
|---|---|---|
| 6,980,556 B2 | 12/2005 | Vimpari |
| 7,020,701 B1 | 3/2006 | Gelvin et al. |
| 7,020,720 B1 | 3/2006 | Donahue et al. |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,200,551 B1 | 4/2007 | Senez |
| 7,240,106 B2 | 7/2007 | Cochran et al. |
| 7,269,653 B2 | 9/2007 | Mentze et al. |
| 7,283,517 B2 | 10/2007 | Yan et al. |
| 7,319,873 B2 | 1/2008 | Zhang et al. |
| 7,337,910 B2 | 3/2008 | Cartmell et al. |
| 7,340,512 B2 | 3/2008 | Cochran et al. |
| 7,388,839 B2 | 6/2008 | Chafle et al. |
| 7,392,310 B2 | 6/2008 | Motoyama et al. |
| 7,421,466 B2 | 9/2008 | Haines |
| 7,460,546 B2 | 12/2008 | Anderson, IV |
| 7,457,737 B2 | 1/2009 | Patiejunas |
| 7,475,133 B2 | 1/2009 | Nuggehalli |
| 7,499,999 B2 | 3/2009 | Ocepek et al. |
| 7,509,415 B2 | 3/2009 | Baekelmans et al. |
| 7,545,762 B1 | 6/2009 | McConnell et al. |
| 7,565,418 B2 | 7/2009 | Ferrari et al. |
| 7,581,039 B2 | 8/2009 | Martinez et al. |
| 7,603,710 B2 | 10/2009 | Harvey et al. |
| 7,657,612 B2 | 2/2010 | Manchester et al. |
| 2001/0039580 A1 | 11/2001 | Walker et al. |
| 2002/0004935 A1 | 1/2002 | Huotari et al. |
| 2002/0010866 A1 | 1/2002 | McCullough et al. |
| 2002/0026503 A1 | 2/2002 | Bendinelli et al. |
| 2002/0026505 A1 | 2/2002 | Terry |
| 2002/0112076 A1 | 8/2002 | Rueda et al. |
| 2002/0116544 A1 | 8/2002 | Barnard et al. |
| 2002/0147938 A1* | 10/2002 | Hamilton et al. ............... 714/6 |
| 2002/0161865 A1 | 10/2002 | Nguyen |
| 2002/0161867 A1 | 10/2002 | Cochran et al. |
| 2002/0174207 A1 | 11/2002 | Battou |
| 2002/0196463 A1 | 12/2002 | Schlonski et al. |
| 2003/0005112 A1* | 1/2003 | Krautkremer ............... 709/224 |
| 2003/0033402 A1 | 2/2003 | Battat et al. |
| 2003/0041238 A1 | 2/2003 | French et al. |
| 2003/0061336 A1 | 3/2003 | Van Den Bosch et al. |
| 2003/0069947 A1 | 4/2003 | Lipinski |
| 2003/0078999 A1 | 4/2003 | Lund et al. |
| 2003/0086425 A1 | 5/2003 | Bearden et al. |
| 2003/0115298 A1 | 6/2003 | Baker |
| 2003/0115314 A1 | 6/2003 | Kawashima |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0229688 A1 | 12/2003 | Liang |
| 2004/0003292 A1 | 1/2004 | Kato |
| 2004/0030620 A1 | 2/2004 | Benjamin et al. |
| 2004/0040023 A1 | 2/2004 | Ellis et al. |
| 2004/0155899 A1 | 8/2004 | Conrad |
| 2004/0162986 A1 | 8/2004 | Metzger |
| 2004/0193709 A1 | 9/2004 | Selvaggi et al. |
| 2004/0199647 A1 | 10/2004 | Ramarao |
| 2004/0236759 A1 | 11/2004 | Young |
| 2005/0018241 A1 | 1/2005 | Azami |
| 2005/0050189 A1 | 3/2005 | Yang |
| 2005/0063350 A1 | 3/2005 | Choudhury et al. |
| 2005/0078681 A1 | 4/2005 | Sanuki et al. |
| 2005/0086197 A1 | 4/2005 | Boubez et al. |
| 2005/0091504 A1 | 4/2005 | Shirogane |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0184852 A1 | 8/2005 | Lee et al. |
| 2005/0198274 A1 | 9/2005 | Day |
| 2005/0229238 A1 | 10/2005 | Ollis et al. |
| 2005/0234568 A1 | 10/2005 | Chung et al. |
| 2005/0234683 A1 | 10/2005 | Graves et al. |
| 2005/0235227 A1 | 10/2005 | Martineau et al. |
| 2005/0240758 A1 | 10/2005 | Lord et al. |
| 2006/0036847 A1 | 2/2006 | Bush et al. |
| 2006/0037036 A1 | 2/2006 | Min et al. |
| 2006/0101109 A1 | 5/2006 | Nishio |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0153080 A1 | 7/2006 | Palm |
| 2006/0168195 A1 | 7/2006 | Maturana et al. |
| 2006/0168263 A1 | 7/2006 | Blackmore |
| 2006/0280189 A1 | 12/2006 | McRae et al. |
| 2006/0291443 A1 | 12/2006 | Harrington et al. |
| 2007/0022185 A1 | 1/2007 | Hamilton et al. |
| 2007/0058567 A1 | 3/2007 | Harrington et al. |
| 2007/0076621 A1 | 4/2007 | Malhotra et al. |
| 2007/0106768 A1 | 5/2007 | Frietsch et al. |
| 2007/0111568 A1 | 5/2007 | Ferrari et al. |
| 2007/0130286 A1 | 6/2007 | Hopmann et al. |
| 2007/0133569 A1 | 6/2007 | Lee et al. |
| 2007/0204150 A1 | 8/2007 | Jokela et al. |
| 2007/0268506 A1 | 11/2007 | Zeldin |
| 2007/0268515 A1 | 11/2007 | Freund et al. |
| 2007/0268516 A1 | 11/2007 | Bugwadia et al. |
| 2008/0037552 A1 | 2/2008 | Dos Remedios et al. |
| 2008/0049779 A1 | 2/2008 | Hopmann et al. |
| 2008/0052384 A1 | 2/2008 | Marl et al. |
| 2008/0065760 A1* | 3/2008 | Damm et al. ............... 709/224 |
| 2008/0070603 A1 | 3/2008 | Mao |
| 2008/0134164 A1 | 6/2008 | Stich et al. |
| 2009/0017832 A1 | 1/2009 | Tebbs et al. |
| 2009/0019141 A1 | 1/2009 | Bush et al. |
| 2009/0019147 A1 | 1/2009 | Ahlers et al. |
| 2009/0052338 A1 | 2/2009 | Kelley et al. |
| 2009/0055514 A1 | 2/2009 | Tebbs et al. |
| 2010/0020694 A1 | 1/2010 | Jones |

FOREIGN PATENT DOCUMENTS

| | | |
|---|---|---|
| JP | 2001-352328 A | 12/2001 |
| KR | 2004-0047209 A | 7/2004 |
| KR | 10-2005-0031175 A | 4/2005 |
| KR | 2005-0078541 A | 8/2005 |
| KR | 2005-0094247 A | 9/2005 |
| WO | WO 2008/156898 | 12/2008 |
| WO | WO 2009/011962 | 1/2009 |
| WO | WO 2009/011963 | 1/2009 |
| WO | WO 2009/011964 | 1/2009 |
| WO | WO 2009/011965 | 1/2009 |
| WO | WO 2009/011966 | 1/2009 |

OTHER PUBLICATIONS

U.S. Appl. No. 11/696,638, filed Apr. 4, 2007, entitled "Network Management Providing Network Health Information and Lockdown Security," Inventor(s) Steve Bush et al.

Marcia Zangrilli, et al., "Using Passive Traces of Application Traffic in a Network Monitoring System," copyright 2004 IEEE.

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

International Search Report for International Application No. PCT/US2008/063335 mailed Sep. 22, 2008 (1 page).

Written Opinion of the International Searching Authority for International Application No. PCT/US2008/063335 mailed Sep. 22, 2008 (4 pages).

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Sep. 26, 2008 (4 pages).

International Search Report for International Application No. PCT/US2008/059490 mailed Apr. 21, 2009 (2 pages).

International Preliminary Report on Patentability issued Oct. 6, 2009 (1 page) and Written Opinion of the International Searching Authority mailed Apr. 21, 2009 (3 pages) for International Application No. PCT/US2008/059490.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.

Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.

Microsoft Corporation, "Windows Connect Now-UFD for Windows XP Specification," © 2010, Updated Sep. 15, 2006, 1 page; http://www.microsoft.com/whdc/connect/Rally/WCN-UFD_XPspec.mspx.

Microsoft Corporation, "Windows Connect Now-UFD for Windows XP," Version 1.1 © 2010—Sep. 15, 2006, 33 pages; http://www.microsoft.com/whdc/connect/Rally/WCN-Netspec.doc.

Microsoft Corporation, "Windows Connect Now-UFD and Windows Vista Specification," Version 1.0 © 2010—Sep. 15, 2006, 1 page; http://www.microsoft.com/whdc/connect/Rally/WCN-UFD_Vistaspec.mspx.

Microsoft Corporation, "Windows Connect Now-UFD Windows Vista" Version 1.0 © 2010—Sep. 15, 2006, 28 pages; http://www.microsoft.com/whdc/connect/Rally/WCN-UFD_Vistaspec.doc.

Microsoft Corporation, "Windows Connect Now—Access Point has No USB Port in Wireless Networking," © 2010, printed Mar. 24, 2010, 2 pages; http://www.microsoft.com/communities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.

Flip Video, "Quick Start Guide: FlipshareTV," © 2009 Cisco Systems, Inc., 19 pages; http://www.theflip.com/pdf/en-US/FlipShareTVQuickStartGuide.pdf.

"Wi-Fi Certified™ for Wi-Fi Protected Setup™ : Easing the User Experience for Home and Small Office Wi-Fi® Networks," © 2007, 14 pages; http://www.wi-fi.org/files/kc/20090123_Wi-Fi_Protected_Setup.pdf.

"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.

"Wi-Fi Alliance™ for Wi-Fi Protected Setup Specification," Version 1.0h, Dec. 2006, 110 pages.

Byoung-Koo Kim/Jong-Su Jang/Tai M. Chung, Design of Network Security Control System for Cooperative Intrusion Detection, 2002, pp. 389-398.

International Preliminary Report on Patentability issued Jan. 19, 2010 (1 page) and Written Opinion of the International Searching Authority mailed Oct. 30, 2008 (4 pages) for International Application No. PCT/US2008/063308 (PURE-11-1002).

International Preliminary Report on Patentability issued Jan. 19, 2010 (1 page) and Written Opinion of the International Searching Authority mailed Sep. 26, 2008 (4 pages) for International Application No. PCT/US2008/063333 (PURE-11-1005).

International Preliminary Report on Patentability issued Jan. 19, 2010 (1 page) and Written Opinion of the International Searching Authority mailed Sep. 22, 2008 (4 pages) for International Application No. PCT/US2008/063335 (PURE-11-1006).

* cited by examiner

NETWORK ADVISOR

PRIORITY CLAIM

This application claims priority from U.S. Provisional Patent Application No. 60/949,610, filed Jul. 13, 2007, entitled "NETWORK ADVISOR," which is hereby incorporated by reference in its entirety as if fully set forth herein.

FIELD OF THE INVENTION

Aspects of the present invention are directed toward a system for providing information of interest to users of a network. Various aspects of the invention are particularly suitable for monitoring the configuration and usage of devices in a small network, and then providing information relevant to the network.

BACKGROUND OF THE INVENTION

Computers have become commonplace tools in modern society, and many businesses and residences now have one or more computing devices. In a small business, for example, some employees may each use a desktop computer or laptop computer. Some employees may even use more portable computers such as personal digital assistants or "smart" wireless telephones. Similarly, with a family sharing a residence, each family member may have his or her personal computer, or the family members may share one or more computers. Further, both small businesses and personal residences may include various computing appliances that incorporate or otherwise interact with computers. For example, a home residence may include a refrigerator, a "Voice over Internet Protocol" telephone, a digital music server, a digital camera, or an environmental control system that includes or interacts with a computer.

In order to optimize the use and flexibility of these computing devices, a business or family may link them together to form a small private network. Typically, each of the computing devices is connected to a router through a network adapter. The router then "routes" packets of data to and from each computing device. With this type of small private network, the router can in turn be connected to one or more larger private networks or a public network, such as the Internet. By sending and receiving messages through the router, each networked computing device may then communicate with computing devices outside of the private network. In this arrangement, the router serves as a "gateway" device that provides a gateway to the electronic world outside of the private network.

While this type of small or "home" network can provide enhanced utility for its member computing devices, even a small network can be very difficult for a non-technical person to set up and maintain. Accordingly, various software developers have created tools to assist novice users in setting up or managing a small network. Conventionally, these tools were embedded in a larger software product, such as an operating system or a utility application. More recently, however, Pure Networks of Seattle, Wash. has developed a dedicated software application tool for managing small networks. This software application tool, available from Pure Networks under the name NETWORK MAGIC™, is described in detail in U.S. Provisional Patent Application No. 60/634,432, filed Dec. 7, 2004, entitled "Network Management" and naming Steve Bush et al. as inventors, and U.S. patent application Ser. No. 11/297,809, filed on Dec. 7, 2005, entitled "Network Management" and naming Steve Bush et al. as inventors, which applications, along with U.S. Provisional Patent Application No. 60/789,522, filed Apr. 4, 2006, entitled "Network Management," U.S. patent application Ser. No. 10/916,642, filed on Aug. 10, 2004, entitled "Service Licensing And Maintenance For Networks," U.S. patent application Ser. No. 11/457,783, filed on Jul. 14, 2006, entitled "Network Device Management," and U.S. patent application Ser. No. 11/457,763, filed on Jul. 14, 2006, entitled "Network Device Setup Utility," are incorporated entirely herein by reference.

Because small network users may often be unsophisticated regarding computing devices, they may not be obtaining the most utility from their network. For example, while a network owner may employ a wireless router to establish the network, he or she may not fully appreciate the need for encryption to maintain the security of the network. Similarly, the network owner may not appreciate the need for virus protection or a firewall for the network.

BRIEF SUMMARY OF THE INVENTION

An embodiment includes a system for diagnosing the configuration and use of devices in an interconnected network. The system may be used to analyze a network and/or discrete network devices, and then suggest steps that a user may take to improve the performance or usability of the network and/or device.

BRIEF DESCRIPTION OF THE DRAWING

Preferred and alternative embodiments of the present invention are described in detail below with reference to the following figures.

DETAILED DESCRIPTION OF THE INVENTION

An embodiment of the invention includes the power to gather information from a home network about the software and hardware environments therein and then dynamically apply on a server side filtering and heuristics that are very flexible and can be adjusted at any time, to render personally relevant results to the home-network user.

Network Environment

Figure 1:
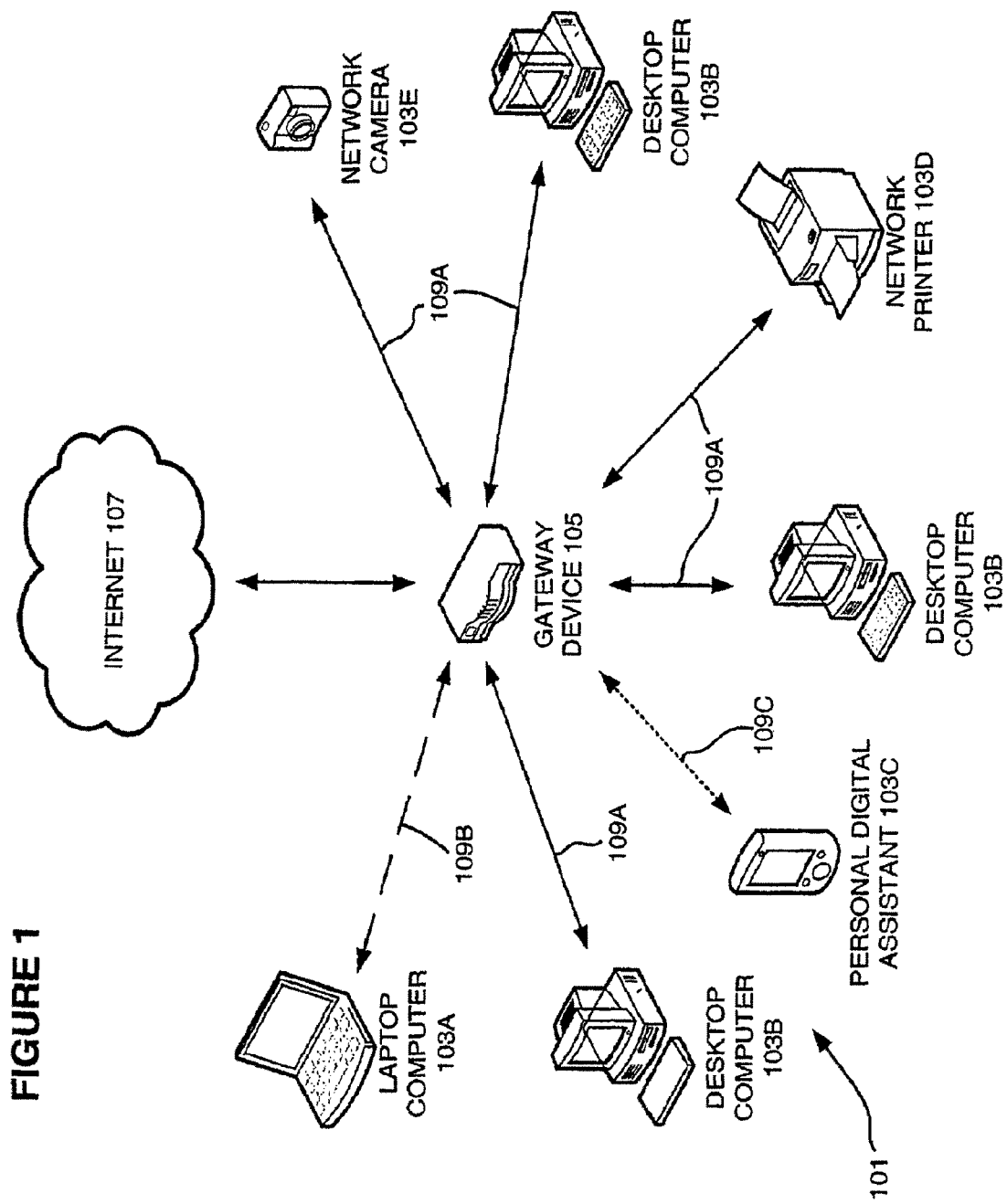
FIG. 1 is a functional block diagram of a network operating environment in which an embodiment of the present invention may be implemented.

As previously noted, various aspects of the invention may be employed with a small network. FIG. 1 illustrates an example of this type of small network. The network 101 may include a variety of different computing devices or "nodes". For example, the network 101 may include one or more laptop computers 103A, one or more desktop computers 103B, and one or more personal digital assistants 103C. In addition to these computers, the network 101 may also include one or more computing appliances, which are not as versatile as a conventional programmable computer, but which nonetheless may be configured to exchange data over a network. Such network appliances may include, for example, one or more printers 103D and one or more cameras 103E, as illustrated in FIG. 1. Other small networks that can be used with various aspects of the invention may include any suitable computing devices, such as telephones that exchange voice information in data packets (sometimes generically referred to as "Voice over Internet Protocol (VoIP) telephones), digital video recorders, televisions, streaming media players, and digital music servers, among others.

Each of these networked devices 103 communicates, either directly or indirectly, with a gateway device 105. In turn, the gateway device 105 typically can communicate with an external device or network. An external network may be another private network, or it may be a public network, such as the Internet 107. Thus, a gateway device is a device that can steer electronic data from one network to another network. Typically, a gateway device serves as a node on two incompatible networks (i.e., networks that use different communication protocol formats) and it can convert data from one network's communication protocol format into the other network's communication protocol format. As used herein, the term "small network" refers to a network made up of networked devices that each employ the same network address to communicate with the same gateway device, together with the gateway device itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 103A is connected to the gateway device 105 through a IEEE 802.11 wireless connection 109B and the personal digital assistant 103C is connected to the gateway device 105 through a Bluetooth wireless connection 109C.

It should be appreciated that, as used throughout this application, the term "connect" and its derivatives (e.g., connection, connected, connects) includes both direct and indirect connections. Thus, with the network illustrated in FIG. 1, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 can be a router. As will be appreciated by those of ordinary skill in the art, a router routes data packets from the networked devices 103 to an external device or network. With some networks, however, the gateway device 105 alternately may be a computer performing router functions, a hub, a bridge, or "layer-3" switch. As will also be appreciated by those of ordinary skill in the art, the computing devices or "nodes" making up the network 101 can communicate with the gateway device 105 using one or more defined communication protocols, such as the Transmission Control Protocol (TCP) and the Internet Protocol (IP).

With these communication protocols, each computing device 103 and gateway device 105 in the network 101 can be assigned a logical address. For example, if the network 101 is connected to the Internet 107 through an Internet service provider, the Internet service provider can assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device typically can also have a physical address. For example, most computing devices capable of communicating over a network, including routers, employ a network adapter with a media access control (MAC) address. This type of physical address is assigned to a network adapter according to standards (referred to as Project 802 or just 802 standards, which are incorporated entirely herein by reference) set forth by the Institute of Electrical and Electronic Engineers (IEEE). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

Network Device Environment

A network may include both virtual devices and physical devices. Physical network devices can then include both computer devices and computing appliance devices. A "computer" may generally be characterized as a device that can be programmed to perform a number of different, unrelated functions. Examples of computers can thus include programmable personal computers, such as desktop computers and laptop computers. In addition, programmable media-purposed computers (e.g., "media adapters and servers"), network attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliance may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, there may be no clear defining line between "computer" network devices and "computing appliance" network devices in a network. For example, a sophisticated print server may be programmable to additionally or alternately function as a data storage server, while a programmable media-purposed computer or programmable personal digital assistant may have restricted functionality due to limited memory, input devices or output devices. Accordingly, as used herein, the term "computer" can refer to any network device that is capable of implementing a network management tool according one or more aspects of the invention, such as a personal programmable computer. The term "computer appliance" then can refer to a network device that typically cannot implement a network management tool according to at least one aspect of the invention without additional augmentation. The term "computing device" is then used herein to include both computers and computing appliances.

With conventional networks located in a home, small office or other local environment, a network management tool according to various aspects of the invention can be implemented on a programmable personal computer, such as a desktop or laptop computer. A general description of this type of computer will therefore now be described.

Figure 2:
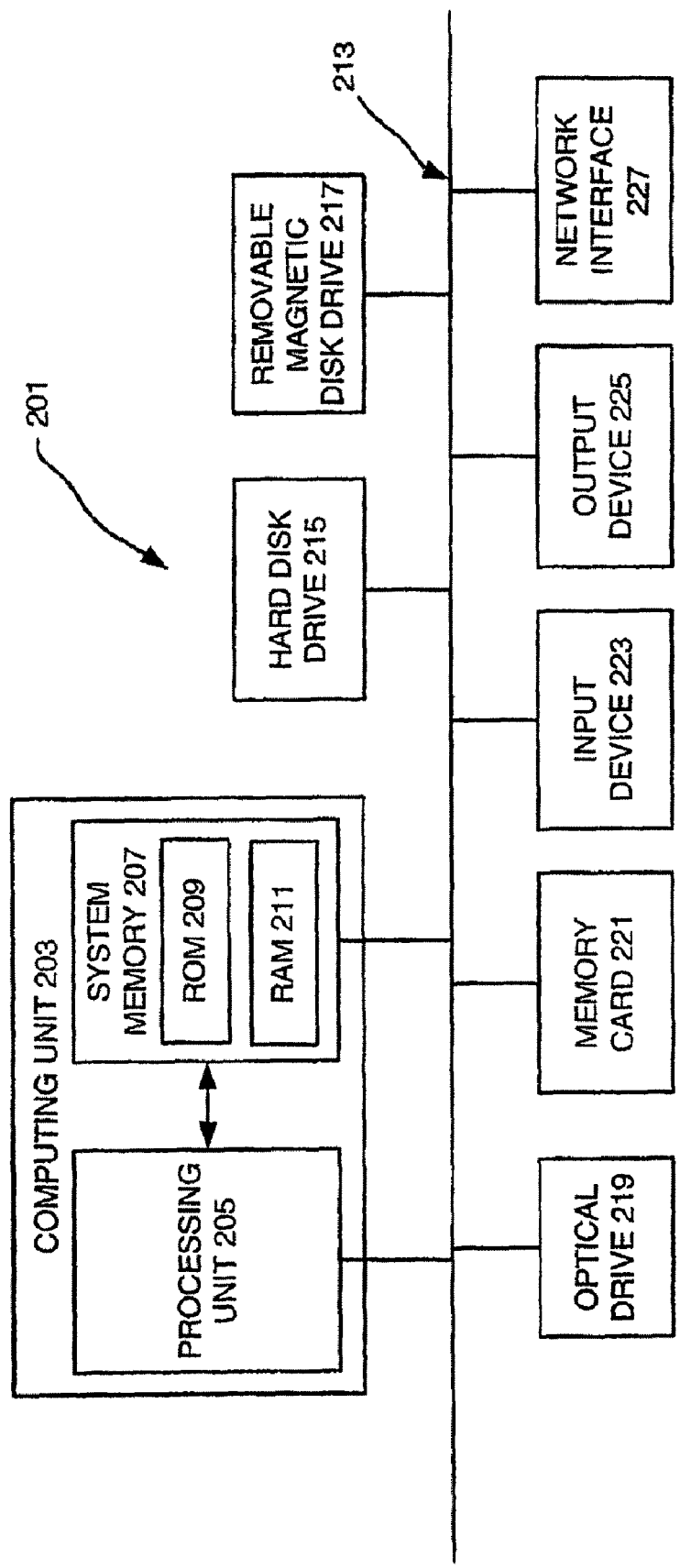
FIG. 2 is a functional block diagram of an operating environment in which an embodiment of the present invention may be implemented.

An illustrative example of such a computer 201 is illustrated in FIG. 2. As seen in this figure, the computer 201 has a computing unit 203. The computing unit 203 typically includes a processing unit 205 and a system memory 207. The processing unit 205 may be any type of processing device for executing software instructions, but can conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 can be directly or indirectly connected to one or more network interfaces 227 for communicating with a network. This type of network interface 227, also sometimes referred to as a network adapter or network interface card (NIC), translates data and control signals from the computing unit 203 into network messages according to a communication protocol, such as the Transmission Control Protocol (TCP), the Internet Protocol (IP), and the User Datagram Protocol (UDP). These protocols are well known in the art, and thus will not be described here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 2, may include only a subset of the components illustrated in FIG. 2, or may include an alternate combination of components, including some components that are not shown in FIG. 2.

It should be noted that, while a general description of a programmable personal computer was provided above, various aspects of the invention may be implemented on any desired device capable of supporting the invention. For example, with some aspects of the invention, the network management tool may be implemented on special purposed programmable computers, such as a programmable media or entertainment-purposed computers, or personal digital assistants. Accordingly, the above description of a programmable personal computer should be understood as illustrative rather than limiting.

A computing appliance may have any combination of the components of the computer 201 discussed above. More typically, however, a computing appliance can be simpler to optimize the performance of a specific function, and thus may have only a subset of these components. For example, a computing appliance may have only a computing unit 203, an input device 223 or an output device 225, and a network interface 227. As will be apparent from the following description, however, a computing appliance can have sufficient computing resources to implement a desired embodiment of the invention in order to provide information to or receive information from a client operating on a separate computing device.

Network Management Tool

Figure 3:
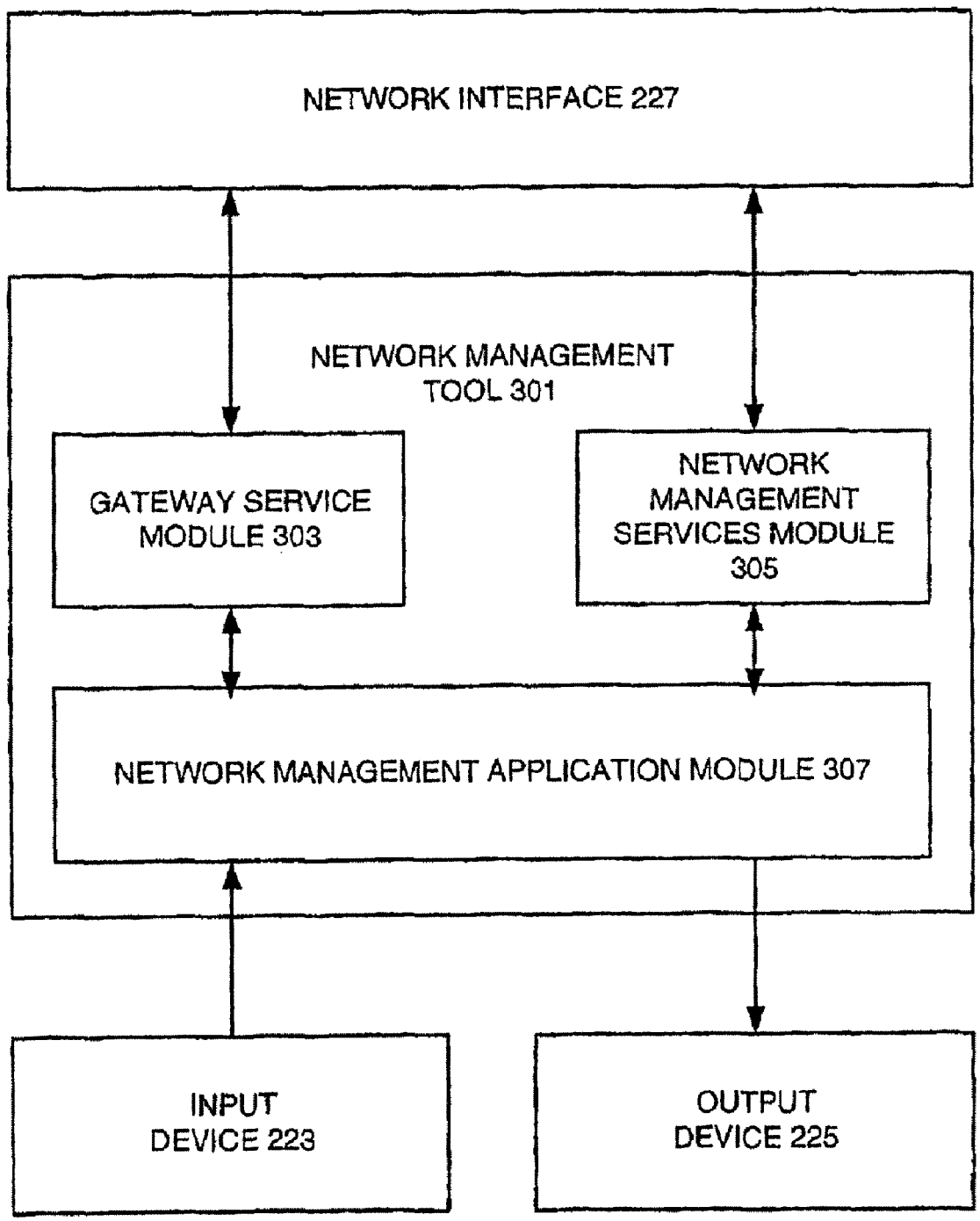
FIG. 3 is a functional block diagram of a component of an embodiment of the present invention in the operating environment of FIG. 2.

FIG. 3 illustrates an example of a network management tool that may be employed according to various aspects of the invention. In the illustrated example, the tool 301 is hosted by a programmable personal computer 201 of the type illustrated in FIG. 2. The network management tool 301 includes a gateway service module 303, a network management services module 305, and network management application module 307. Both the gateway service module 303 and the network management services module 305 are connected, either directly or indirectly, to the network interface 227 of the computer 201. As will be described in detail below, the gateway service module 303 and the network management services module 305 communicate with various network devices through the network interface 227. The network management services module 305 provides a set of network services that are used by the network information service module 1004 and the network application module 307. The network management application module 307 is then connected, either directly or indirectly, to the input device 223 and the output device 225 of the computer 201.

As will be described in further detail below, the network management tool 301 allows a user to monitor the status of devices on an electronic network, such as a network employing the Ethernet protocol located in a home or small business. The network management tool 301 may also allow a user to administer various tasks associated with the network or devices in the network. To perform these functions, the gateway service module 303 detects and identifies the gateway, which typically is a router, through which the network is connected to other networks. The gateway service module 303 also generates a unique name for the gateway.

Once the gateway for the network has been detected, identified and named, the network management services module 305 obtains and stores information relating to the various devices in the network. More particularly, the network management services module 305 detects each device in the network. For example, the network management services module 305 can identify and detect other computers, networked printers and print servers, networked scanners, networked cameras, VoIP telephones and VoIP telephone adapters, networked digital video recorders, networked televisions, data storage servers, bridges, networked game consoles, media adapters, networked photo frames, wireless access points and network adapters for each of these other devices. It then queries those devices, to identify each network device and to collect information relating to each device. For example, the network management services module 305 may determine one or more properties for a network device, such as its Media Access Control (MAC) address, its Internet Protocol (IP) address, and the other network devices to which it is connected. The network management services module 305 also detects and identifies devices locally connected to the computer 201, such as local printers, local cameras, local scanners, and local storage devices.

After collecting this network information, the network management services module 305 constructs a network information data structure to organize and store the information collected by both the gateway service module 303 and the network management services module 305. The network management services module 305 can use the network services in the network information services module 1004 to interact with the services provided by the local operating system for gathering device, network, and operation system status and other statuses. For example, with some aspects of the invention, the network management services module 305 creates a markup language file storing the collected network information. More particularly, the network management services module 305 can create a data object for each network device. The data object may be represented in a markup language, such as the extensible markup language (XML). A data object for a device may include an identifier for the device and the determined properties for that device. The data objects for each device can then be organized in a hierarchical fashion into a single data file.

In addition to determining and storing the properties of network devices, the network management services module 305 also communicates with implementations of the network management tool 301 on other computers in the network. More particularly, the network management services module 305 detects instances of the network management tool 301 running on other computers in the network. The network management services module 305 then establishes a communication channel with those instances of the network management tool 301 that have the proper credentials. In this manner, the instances of the network management tool 301 sharing the proper credentials form an association of trusted network management tools 301. The network management services modules 305 can then exchange determined device properties over the communication channels. By exchanging the device properties, each instance of the network management tool 301 can maintain a current copy of a data structure containing the device properties of all of the devices in the network.

The network management application module 307 then coordinates the information managed by the gateway service module 303 and the network management services module 305. More particularly, the network management application module 307 initiates a call to both the gateway service module 303 and to the network information service module 305 to begin their services. The network management application module 307 also provides one or more user interfaces displaying the information obtained and stored by the network management services module 305. These services may or may not also be made available to other applications through programming interfaces.

A user may employ such an interface to monitor the status of the network and the network devices. For example, with some aspects of the invention, the network management application module 307 employs the connection information stored in the network information data structure to create a graphical map of the network. The map may include a graphical icon representing each device, and another graphic to represent connections between the devices. It may, for example, use one type of icon to indicate a wired connection, and another type of icon to indicate a wireless connection. The map may also show the status of the various devices in the network, such as whether a device is presently connected to the network.

With some aspects of the invention, the network management application module 307 may provide interfaces that allow the user to administer one or more functions related to the operation of the network. For example, the network management application module 307 may provide a user interface that permits a user to modify the contents in the network information data structure maintained by the network management services module 305. As noted above, this change may subsequently be shared with other instances of the network management tool 301 in a trusted association, thereby propagating the change throughout the network. The network management application module 307 may also provide a user interface that allows a user to share one or more resources on the computer 201 with other computers in the network. For example, a user interface provided by the network management application module 307 may allow a user to share a data resource, such as a folder or data file. Alternately or additionally, a user interface provided by the network management application module 307 may allow a user to share a physical resource, such as a printer, scanner, or a storage device.

With some aspects of the invention, the various monitoring and administration functionality available to the user may be provided through a single user interface, such a map of the network. Alternately, the network management application module 307 may provide this functionality through multiple user interfaces that can be selected by a user.

Examples and aspects of network management tools that may be employed according to various implementations of the invention are discussed in more detail in, for example, U.S. patent application Ser. No. 11/467,534 filed on Aug. 25, 2006, entitled "Network Administration Tool Employing A Network Administration Protocol" and naming Brett Marl as inventor, which application in turn claims priority to U.S. patent application Ser. No. 11/297,809 filed on Dec. 7, 2005, entitled "Network Management" and naming Steve Bush et al. as inventors, which application in turn claims priority to U.S. Provisional Patent Application No. 60/634,432, filed Dec. 7, 2004, entitled "Network Management" and naming Steve Bush et al. as inventors, each of which applications are incorporated entirely herein by reference. U.S. patent application Ser. No. 11/457,783, filed Jul. 14, 2006, entitled "Network Device Management" and naming Brett Marl as inventor is incorporated entirely herein by reference as well.

Advisor Module

Figure 4:
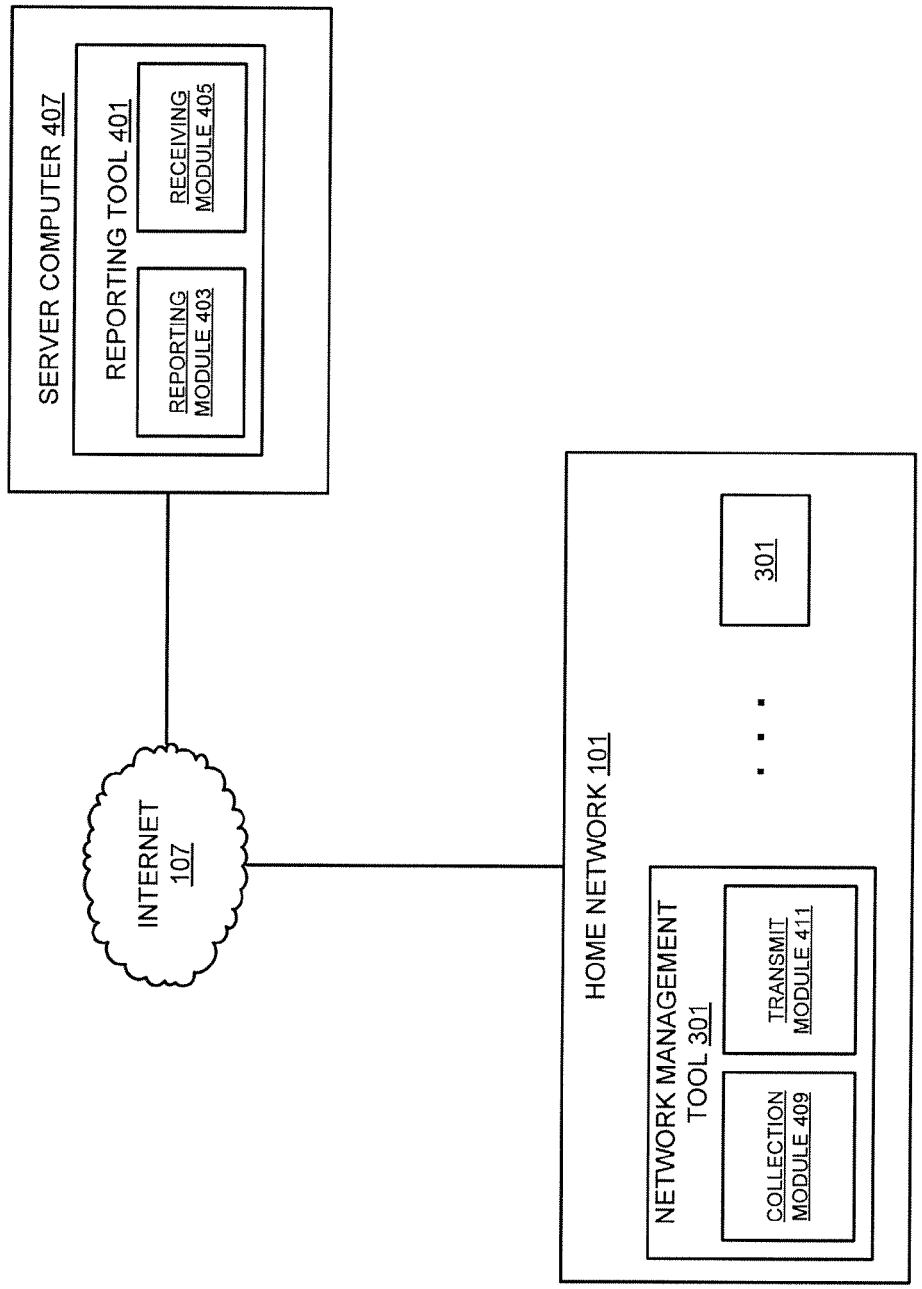
FIG. 4 is a functional block diagram of an embodiment of the present invention implemented in a network operating environment.

As shown in FIG. 4, with various embodiments of the invention a diagnostic system may include an advisory tool 401 that includes an advisor module 403 and a receiving module 405 implemented on a server computer 407 remote from the network 101.

As will be discussed more fully hereinafter, or as otherwise discussed in the patent applications incorporated by reference herein, one or more instantiations of a network management tool 301 implemented on computing devices (not shown in FIG. 4) in the network 101 can provide network information to remote devices or entities, such as the reporting tool 401. As illustrated in FIG. 4, the tool 301 may include an information collection module 409 and an information transmission module 411, the functionality of each of which is provided by one or more of the gateway service module 303, network management services module 305 and network management application module 307. Using the techniques described herein, or otherwise in the patent applications incorporated by reference herein, the information collection module 409 of the network management tool 301 of a computing device can collect a wide variety of information from which useful reports and/or diagnostics can be prepared.

In response to receiving information from the transmission module 411, the advisor module 403 provides a set of services for recommending new products or services to the proprietor of the home or other small network 101. Specifically, the advisor module 403 employs heuristics to recommend, via email, secure web site, or other appropriate presentation mode, new products or services based on the configuration and usage of resources within the network 101. The heuristics utilized by the advisor module to recommend products or services may be downloaded by the advisory tool 401 from a third party on the Internet 107.

Figure 5:
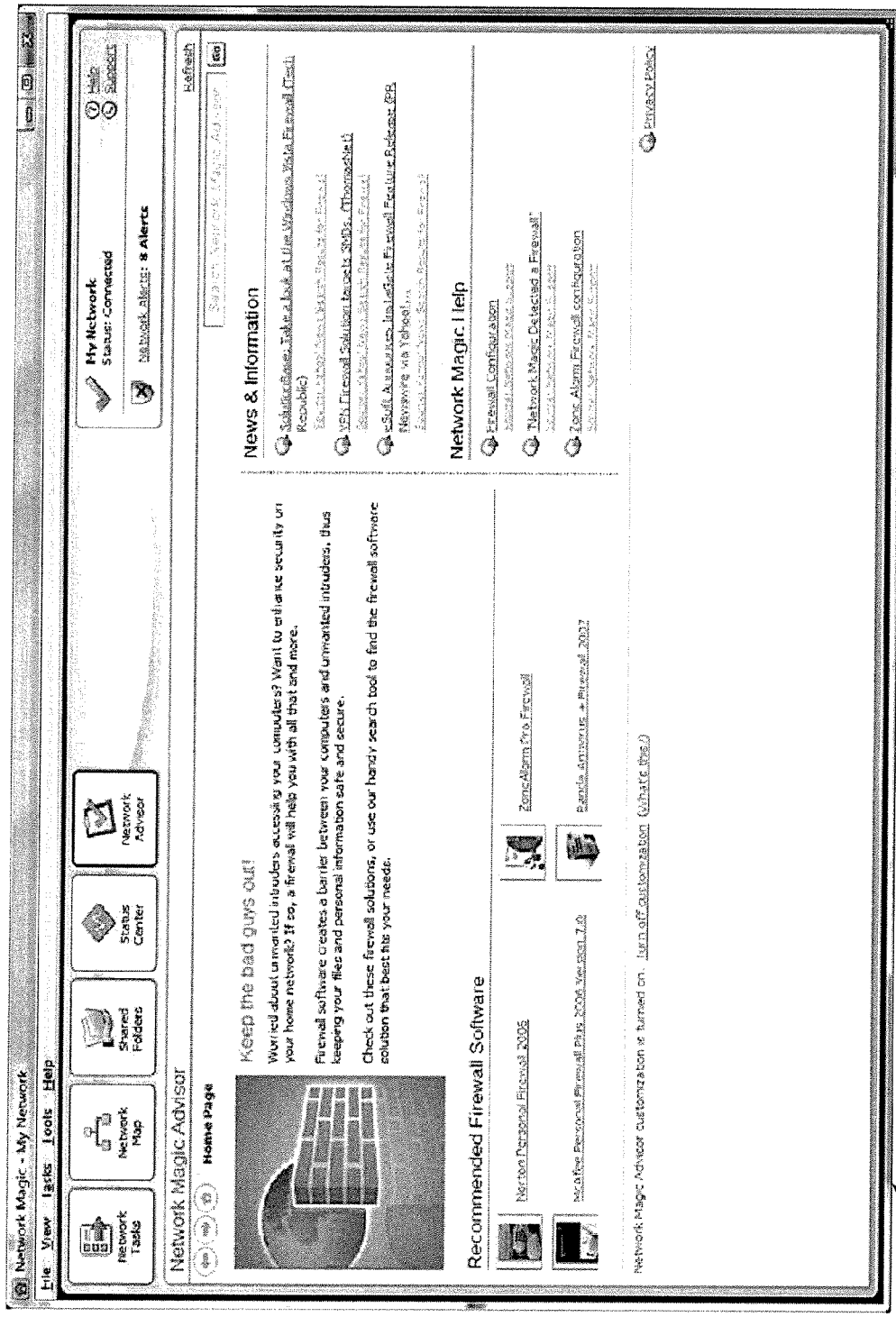
FIG. 5 is an illustrative view of a user interface generated according to an embodiment of the invention.

For example, the advisor module 403 may employ a set of heuristics to decide whether or not to provide the network owner with a recommendation to add a network media adapter to the network 101. As known in the art, a network media adapter enables viewing and listening to music, photos, and videos located on a network device on the user's television or stereo. The advisor module 403 may execute one or more heuristics to analyze the network information collected and provided by the network management tools 301 and to determine whether or not the network 101 already includes a media adapter. Further, the advisor module 403 may analyze the collected network information to count the number of files the user has shared on the network 101. If the user has a predetermined threshold number of files shared, and no media adapter exists on the network 101, then the advisor module 403 may provide the network owner (via, e.g., a user interface 501 (FIG. 5) generated by the network management tool 301) with a recommendation to add a media adapter to the network.

Additionally, the advisor module 403 may analyze the product versions of the network devices (FIG. 1) hosted on the network 101. If there are newer versions of the network devices, then the advisor module 403 may employ heuristics to provide the network owner with a recommendation for upgrading the network device. The upgrade recommendation may also include instructions or computer code that displays the user interface 501 to assist the user in upgrading the network device.

By way of further example, and as described in Table 1 below, the collection module 409 can determine real-time performance characteristics of the network 101 to enable the advisor module 403 to suggest hardware improvements to the network, determine existing software inventory installed on network devices to enable the advisor module to recommend supplementary/complementary software packages or services, determine an inventory of hardware devices on the network to enable the advisor module to recommend supplementary/complementary hardware devices, and/or determine local disk, resource or file system information associated with the network to enable the advisor module to recommend corresponding solutions.

TABLE 1

| Exemplary Scenario | Information Input to Advisor Module 403 | General Recommendation |
|---|---|---|
| If advisor module 403 determines that the internet download speed associated with network 101 is slow and the network employs a DSL connection, advisor module may suggest a switch to a cable connection. | WAN connection speed | Upgrade to a better ISP connection. |
| If advisor module 403 determines that a network card is running on the older 802.11b standard and a router running on the 802.11n standard, advisor module can suggest a hardware upgrade. | Network Card Speed Router Speed | Upgrade Router and/or Network Card |
| If advisor module 403 determines that there is no printer associated with network 101, advisor module may suggest a printer be added. | Devices (or lack thereof) on Network | Acquire a printer if none found. |
| If advisor module 403 determines that one or more devices on the network 101 have stored thereon a large number of photos but there is no photo printer associated with the network, suggest a photo printer be added. | Files on hard disks Devices on Network | Acquire a photo printer to optimize enjoyment of multimedia assets. |
| If advisor module 403 determines that network 101 includes an XBOX, but no Media PC, suggest a Media PC be added (or vice-versa). | Devices on Network | Recommend purchase of supplementary/ complementary hardware devices. |
| When the iPhone launches, advisor module 403 can inform people who have Macs on their network, and thus may be interested, of this event. | Devices on Network | Recommend purchase of supplementary/ complementary hardware devices. |
| If the user associates an iPhone with network 101, advisor module 403 recommends "cool" accessories | Devices on Network | If new device added to network, recommend corresponding accessories. |
| If advisor module 403 determines the network 101 has a large number of files on constituent disks and available space is low, recommend more storage. | Network-device Status | Recommend NAS (network attached storage). |
| If advisor module 403 determines that network 101 has NAS device but no backup software, recommend a NAS backup solution | Software Inventory Devices on Network | Recommend Backup Software |
| If advisor module 403 determines no PC protection software present on one or more devices on network 101 (e.g., Anti-Virus, Anti-Spyware, Anti-Spam, Firewall) | Software Inventory | Recommend protection software |
| If advisor module 403 determines a large number of music or picture files present on devices of network 101, suggest a mobile solution for remote access via device. | File System Info Devices on Network | Suggest mobile access service. |

TABLE 1-continued

| Exemplary Scenario | Information Input to Advisor Module 403 | General Recommendation |
|---|---|---|
| If advisor module 403 determines that there are no mp3 files stored on network 101, recommend methods of mp3-file creation. | File System Info | Inform user how to create/access certain file types of potential interest. |

In an embodiment, the advisory tool 401 stores the heuristics information on the server 407 in an SQL database. This enables the advisor module 403 to build recommendation rules on the fly, which may involve construction of complex SQL queries to extract the data.

In an embodiment of the invention, the user interface 501 providing the recommendation information may include branding of one or more manufacturers offering products that may be part of a solution to any deficiency in the network 101 diagnosed by the advisory tool 401. Additionally, the recommendations may include the brand of the distributor of the network management tool 301. Additionally, the advisor module 403 may track metrics pertaining to the effectiveness of a recommendation displayed to the proprietor of the network 101. The metrics may include, for example, the number of impressions (i.e., views of the recommendation), the amount of time the user spent viewing the recommendation, and the number of times the user clicked on the recommendation.

In addition to specific recommendations for products or services, the advisor module 403 may also provide more general information that may be of interest to the user of the network. For example, if the advisor module 403 determines that the network 101 does not include a wireless router, then the advisor module 403 may provide the user with one or more RSS feeds, online articles, or other information discussing the pros and cons of the use of wireless routers, and/or instructions for setting up a wireless router. Alternately or additionally, the advisor module 403 may provide the user with a link to one or more online catalogs that sell a recommended product or service.

An embodiment of the interface 501 includes featured articles, related purchases, general RSS feeds and specific RSS feeds. When the interface 501 is being viewed, it may have a "keyword context." This keyword may be the result of a user-supplied query, may have come from user selection of a featured article, or may pertain to one or more components that the advisor module 403 determines are included in or absent from the network 101. For example, in the case where a user switches to the interface 501, the advisor module 403 can select one of the recommendations in random rotating order (i.e., rotating recommendations). The interface 501 may thus display a featured article and/or some associated keywords pertaining to the recommendation. Alternatively or additionally, in the case where the user enters a search term into the search box, such as "printer" or "wireless network", these keywords can be relevant for the context such that a featured article and/or some associated keywords are displayed. In addition to offering the user rotating recommendations based on their network, the advisory tool 401 has the ability to aggregate content from multiple online locations and show that content in the context in which the user is searching.

This keyword context can then be applied to other content feeds, and these feeds can then be filtered on that context for relevant search results. For example, if the context is "network storage devices," then the "Related Purchases" section can show a selection of products available for purchase; the General RSS Feeds section can show relevant industry articles or blog posts about network storage devices and such reviews; and finally the Specific RSS feeds can show content authored by a blog and/or support team associated with provision of the advisor module 403 and that may be relevant (e.g., in this case—how does the advisory tool 401 function with network storage devices).

Figure 6:
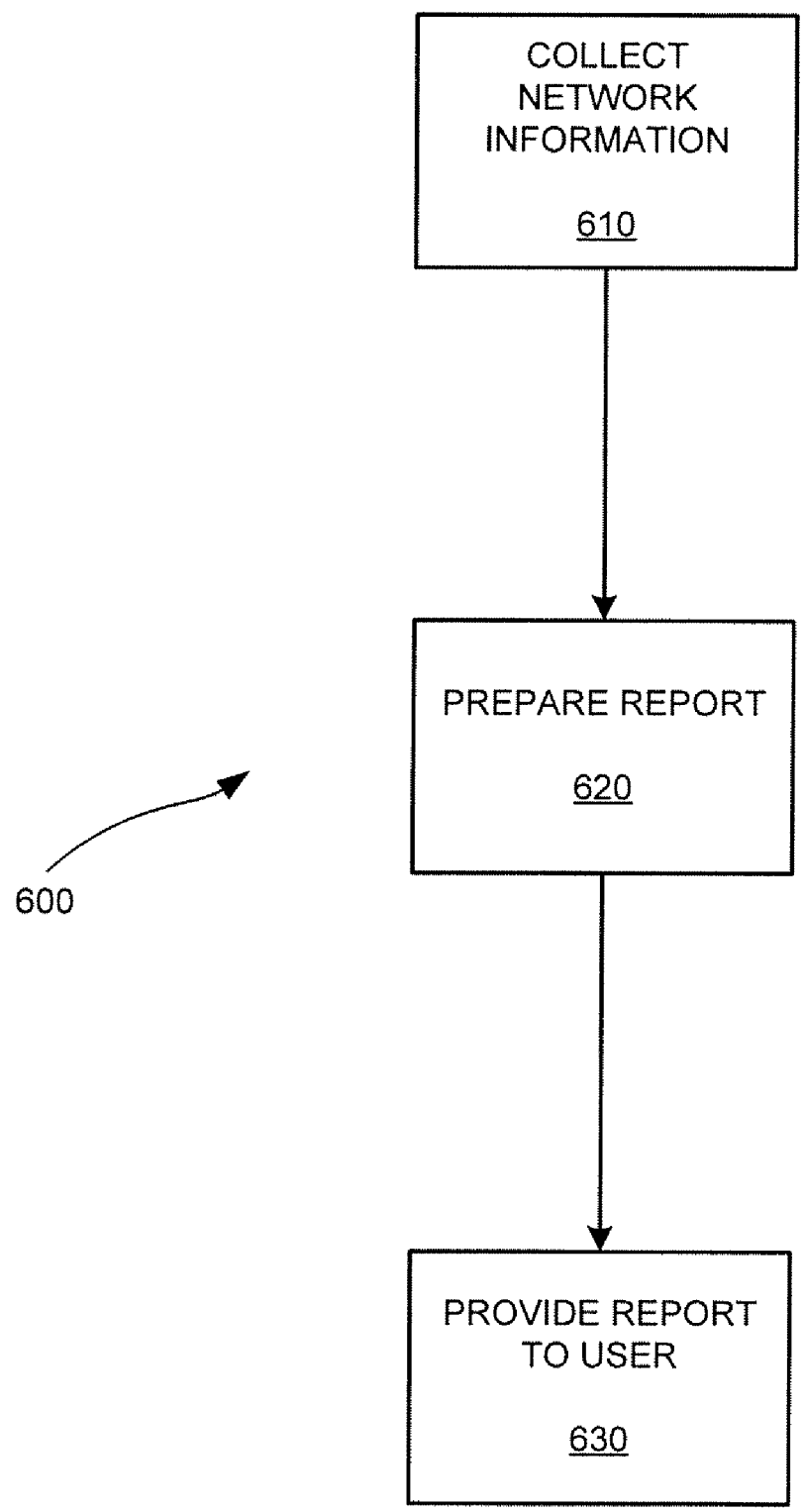
FIG. 6 is a flowchart illustrating a process according to an embodiment of the invention.

FIG. 6 illustrates a process 600, according to an embodiment of the invention. The process 600 is illustrated as a set of operations shown as discrete blocks. The process 600 may be implemented in any suitable hardware, software, firmware, or combination thereof. As such the process 600 may be implemented in computer-executable instructions that can be transferred from one computer, such as server 407, to a second computer, such as a device on network 101, via a communications medium, such as Internet 107. The order in which the operations are described is not to be necessarily construed as a limitation.

At a block 610, information characterizing a remote network is collected from the remote network. The remote network includes at least one electronic device, such as a computer. In an embodiment, this information collection involves providing to the remote network a network management tool executable on at least one electronic device of the remote network. For example, the administrators of the server 407 may provide the tool 301 to the user of the network 101. As such, the tool 301 may cooperate with devices on the network 101 to collect data and information (e.g., network devices, software inventory, etc.) described herein.

At a block 620, a deficiency associated with the remote network is automatically determined based on the collected information. For example, and as discussed above, upon receiving data from the tool 301, the advisor module 403 can determine hardware and/or software missing from the network 101 that would otherwise optimize the performance and/or utility of the network.

At a block 630, a report suggesting a remedy to the deficiency is automatically generated. For example, upon ascertaining any deficiencies in the network 101, the advisor module 403 can prepare a report recommending hardware and/or software that would optimize the performance and/or utility of the network. In generating the report, the advisor module 403 may apply a set of heuristics to the collected information.

At a block 640, the report is automatically provided to a user. For example, once the report is prepared, the advisory tool 401 may send the report to a user's email address. In an embodiment, this report provision may involve providing the report to the user via a web page accessible by the user. In another embodiment, this report provision may involve providing the report to the user via a window generated by a desktop application, such as, for example, an interface similar to the interface 501 illustrated in FIG. 5.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as described herein.

What is claimed is:

1. A diagnostic system, comprising:
   (a) a first network-management tool executable on a first computer device and comprising:
      a processor and a memory;
      a first device-information collection module configured to collect information relating to the first computer device, and
      an information-transmission module configured to transmit collected information to an electronic device remote from the first computer device; and
   (b) an advisory tool executable on a server computing device and comprising:
      an information-receiving module configured to receive the collected information, and
      an advisor module configured to determine, based on the collected information, a deficiency associated with the first computer device and generate a report suggesting a remedy to the deficiency, wherein the advisor module is configured to evaluate files in the first computer device in order to make a recommendation about adding a media network adapter to the first computer device, and wherein the advisor module is configured to evaluate a connection speed in order to recommend a connection type for coupling the first computer device to a network, and wherein the advisor module is configured to evaluate the first computer device in order to recommend a software protection mechanism.

2. The diagnostic system recited in claim 1, further comprising:
   a second network-management tool executable on a second computer device and comprising:
      a second device-information collection module configured to collect information relating to the second computer device,
      an information-sharing module configured to share the information relating to the second computer device with the first computer device; and
   wherein the first network-management tool further includes a synchronization module configured to receive the information collected by the first device-information collection module, receive the information collected by the second device-information collection module, synchronize the information collected by the first device-information collection module with the information collected by the second device-information collection module, and provide the synchronized collected information to the information transmission module.

3. The diagnostic system recited in claim 2, wherein the first computer device and the second computer device are members of the same network.

4. The diagnostic system recited in claim 1, wherein the information collected by the first device-information collection module relates to software applications run by the first computer device.

5. The diagnostic system recited in claim 4, wherein the suggested remedy generated in response to the collected information comprises a recommendation that a particular software application be installed on the first computer device.

6. The diagnostic system recited in claim 1, wherein the information collected by the first device-information collection module relates to wide-area-network connection speed of the first computer device.

7. The diagnostic system recited in claim 6, wherein the suggested remedy generated in response to the collected information comprises a recommendation that a higher-quality network connection be applied to the first computer device.

8. The diagnostic system recited in claim 1, wherein the information collected by the first device-information collection module relates to devices on a network of which the first computer device is a member.

9. The diagnostic system recited in claim 8, wherein the suggested remedy generated in response to the collected information comprises a recommendation that a particular device be added to the network.

10. The diagnostic system recited in claim 1, wherein the information collected by the first device information collection module relates to types of files stored on the first computer device.

11. The diagnostic system recited in claim 10, wherein the suggested remedy generated in response to the collected information comprises a recommendation that a particular device be coupled to the first computer device.

12. The diagnostic system recited in claim 1, wherein the information collected by the first device information collection module relates to product versions of network devices on a network of which the first computer device is a member.

13. The diagnostic system recited in claim 12, wherein the suggested remedy generated in response to the collected information comprises a recommendation of an upgrade to the network device.

14. The diagnostic system recited in claim 1, wherein the report comprises a user interface configured to assist a user in obtaining the remedy.

15. The diagnostic system recited in claim 14, wherein the user interface includes an aggregation of content describing a product associated with the remedy.

16. The diagnostic system recited in claim 14, wherein the user interface includes a link to an online source for a remedial object.

17. A method to be performed in conjunction with a processor and a memory, comprising:
   collecting from a remote network information characterizing the remote network, wherein the remote network comprises at least one electronic device;
   automatically determining, based on the collected information, a deficiency associated with the remote network;
   automatically generating a report suggesting a remedy to the deficiency; and
   automatically providing the report to a user associated with the network, wherein an advisor module is configured to evaluate files in a computer device in order to make a recommendation about adding a media network adapter to the computer device, and wherein the advisor module is configured to evaluate a connection speed in order to recommend a connection type for coupling the computer device to the remote network, and wherein the advisor module is configured to evaluate the computer device in order to recommend a software protection mechanism.

18. The method of claim 17 wherein collecting information comprises providing to the remote network a network management tool executable on at least one network device of the remote network.

19. The method of claim 17 wherein generating a report comprises applying a set of heuristics to the collected information.

20. The method of claim 17 wherein providing the report comprises providing the report to the user via a web page accessible by the user.

* * * * *